(12) United States Patent
Kraft et al.

(10) Patent No.: US 6,912,521 B2
(45) Date of Patent: Jun. 28, 2005

(54) SYSTEM AND METHOD FOR AUTOMATICALLY CONDUCTING AND MANAGING SURVEYS BASED ON REAL-TIME INFORMATION ANALYSIS

(75) Inventors: Reiner Kraft, Gilroy, CA (US); Peter Chi-Shing Yim, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 269 days.

(21) Appl. No.: 09/878,484

(22) Filed: Jun. 11, 2001

(65) Prior Publication Data

US 2002/0188777 A1 Dec. 12, 2002

(51) Int. Cl.[7] .............................................. G06F 17/30
(52) U.S. Cl. ............................................. 707/2; 705/10
(58) Field of Search ..................... 707/2, 104.1; 705/10

(56) References Cited

U.S. PATENT DOCUMENTS

| | | | |
|---|---|---|---|
| 5,785,043 A | | 7/1998 | Cyrus et al. |
| 5,893,098 A | | 4/1999 | Peters et al. |
| 6,029,195 A | * | 2/2000 | Herz ............................ 725/116 |
| 6,055,513 A | * | 4/2000 | Katz et al. ..................... 705/26 |
| 6,061,660 A | * | 5/2000 | Eggleston et al. ............. 705/14 |
| 6,093,026 A | * | 7/2000 | Walker et al. ................. 434/322 |
| 6,167,395 A | * | 12/2000 | Beck et al. ..................... 707/3 |
| 6,177,931 B1 | * | 1/2001 | Alexander et al. ............. 725/52 |
| 6,189,029 B1 | * | 2/2001 | Fuerst ......................... 709/217 |
| 6,195,652 B1 | * | 2/2001 | Fish ............................... 707/2 |
| 6,223,177 B1 | * | 4/2001 | Tatham et al. ................. 707/9 |
| 6,473,084 B1 | * | 10/2002 | Phillips et al. ............... 345/440 |
| 6,484,196 B1 | * | 11/2002 | Maurille ...................... 709/206 |
| 6,493,703 B1 | * | 12/2002 | Knight et al. .................. 707/3 |
| 6,515,681 B1 | * | 2/2003 | Knight ......................... 345/751 |
| 6,735,568 B1 | * | 5/2004 | Buckwalter et al. ........... 705/1 |
| 6,741,967 B1 | * | 5/2004 | Wu et al. ...................... 705/10 |
| 6,745,178 B1 | * | 6/2004 | Emens et al. .................. 707/3 |
| 6,789,047 B1 | * | 9/2004 | Woodson ..................... 702/182 |
| 2001/0032115 A1 | * | 10/2001 | Goldstein ..................... 705/10 |
| 2001/0056398 A1 | * | 12/2001 | Scheirer ....................... 705/38 |
| 2002/0002586 A1 | * | 1/2002 | Rafal et al. .................. 709/205 |
| 2002/0035488 A1 | * | 3/2002 | Aquila et al. .................. 705/4 |
| 2002/0042733 A1 | * | 4/2002 | Lesandrini et al. ............ 705/10 |
| 2002/0065802 A1 | * | 5/2002 | Uchiyama ...................... 707/1 |
| 2002/0143626 A1 | * | 10/2002 | Voltmer et al. ............... 705/14 |
| 2002/0147625 A1 | * | 10/2002 | Kolke ............................ 705/9 |

\* cited by examiner

*Primary Examiner*—Wayne Amsbury
(74) *Attorney, Agent, or Firm*—Delio & Peterson, LLC; Leonard T. Guzman (57) ABSTRACT

The present invention provides a system and technique for initiating, conducting, and managing real-time surveys, in the context of a real-time discourse, such as Internet chat, to provide dynamic, real-time survey results. A surveyor initiates a survey by filling out an electronic form which is processed and submitted to a sorting component of the invention. The invention imposes an additional layer of functionality upon a Live Information Selection and Analysis tool which gathers, summarizes, and indexes chat messages in a real-time discourse. The sorting component matches the collected real-time chat messages from the LISA tool with correlating submitted survey queries to provide raw real-time survey results which are converted into a viewable format for submission to the surveyor. The present invention makes it possible to initiate, conduct, and manage multiple surveys simultaneously to provide accurate, dynamic, real-time survey results within the context of a real-time discourse.

35 Claims, 5 Drawing Sheets

SYSTEM AND METHOD FOR AUTOMATICALLY CONDUCTING AND MANAGING SURVEYS BASED ON REAL-TIME INFORMATION ANALYSIS

BACKGROUND OF THE INVENTION

1. Field of the Invention

The present invention relates generally to real-time information retrieval and submission technologies and in particular to a system and method for initiating and conducting real-time surveys on a computer network between at least two client computers.

2. Description of Related Art

The use of the Internet as a generalized communication medium has become increasingly popular over the years. As the Internet is expanded in its capabilities and surges in popularity it is manifesting itself in nontraditional ways, the scope of which had never been fully anticipated. In particular, with the exponential rise in the number of Internet users, real-time Web based interaction, such as that seen in Internet "Chat," has emerged as an amazingly popular and persuasive mode of communication.

On the Internet, the term "chatting" is used to refer to the act of "talking" to other people who are using the Internet at the same time. "Chatting" involves the broadcast, multicast, or unicast of messages typed in real-time, and the use of sound and graphics in real-time, amongst a group of users occupying the same space (i.e., connected to the same server or related group of servers) on a local net-work computer or a global net-work computer accessing an Internet. A chat may be an ongoing or scheduled session on an Internet site (the "chat site") which serves as a common repository for all messages whereby the users may enter and leave the chat site at will. In the context of Internet chats, the users of the chat sites may themselves be situated in different geographical locales and may be connected using any number of different client programs, browsers, or Internet service providers ("ISP").

Often, chats are focused on a particular topic or theme, whereby a given chat-site may be a host to multiple chats, each corresponding to a different theme yet taking place at the same time in different "chat rooms," which are essentially specialized sub-domains within the broader chat-site. Hence, participants within the same chat-room generally share a common interest or concern which brings them together. Currently, most chat activity appears to be informal and recreational; however, specialized channels where professionals exchange valuable opinions and engage in constructive dialogues are becoming increasingly prevalent.

In the context of the Internet, surveys are also becoming increasingly popular. Surveys are an important part of today's marketing work. In conducting surveys, the essential goal is to find out more about consumers likes and dislikes, and their opinions about specific topics. Typically, surveys are performed by marketing companies which often spend large portions of their budgets on initiating and conducting surveys. Conventional surveys may be performed by telephone, mail, e-mail, or using the Internet whereby the surveys are initiated and conducted at a first point in time, then subsequently submitted to a survey participant at a later point in time, and still subsequently completed by the survey participant at an even further point in time. Still further in time, the survey answers are then retrieved and analyzed by the surveyor. However, as a result of conventional surveys being received by the surveyor at a time later than the submission and answering of the survey query, the survey results are often outdated or archaic as the opinions of those polled survey participants may have changed over time. Another problem with such conventional surveys is that processing the data obtained from conventional surveys is often expensive, time consuming, difficult, and requires increased manual labor and resources.

Therefore, a need exists in the art for a system and method which can easily, affordably, and quickly conduct surveys and analyze the results of such surveys to provide current, accurate survey results.

Bearing in mind the problems and deficiencies of the prior art, it is therefore an object of the present invention to provide a system and method for conducting surveys having accurate, up-to-date survey results for retrieval by surveyors.

It is another object of the present invention to provide a system and method for producing quick and comprehensive survey results.

A further object of the invention is to provide a system and method for easily initiating, conducting and managing surveys in real-time.

Another object of the invention is to provide a system and method for easily initiating, conducting and managing dynamic surveys.

It is yet another object of the present invention to provide a system and method for initiating and conducting surveys in real-time at reduced costs and resources.

Another object of the present invention to provide a system and method for initiating and conducting a variety of surveys simultaneously having accurate, up-to-date survey results.

Still other objects and advantages of the invention will in part be obvious and will in part be apparent from the specification.

SUMMARY OF THE INVENTION

The above and other objects and advantages, which will be apparent to one of skill in the art, are achieved in the present invention which is directed to, in a first aspect, a method for managing a survey within a real-time paradigm based on real-time information. The method includes receiving at least one electronic form having at least one survey query, collecting at least one real-time message from a real-time discourse, matching the at least one real-time message to the at least one survey query to provide a dynamic, real-time survey result, and outputting the dynamic, real-time survey result to the survey within the real-time paradigm. Preferably, the real-time discourse is an Internet chat room and the real-time message is an Internet chat message.

The instant invention may also include receiving a plurality of electronic forms having a plurality of differing survey queries, collecting a plurality of real-time messages from the real-time discourse, matching the plurality of real-time messages to correlating ones of the plurality of differing survey queries of the plurality of electronic forms to provide a plurality of dynamic, real-time survey results, and outputting the plurality of dynamic, real-time survey results to correlating ones of a plurality of the survey within the real-time paradigm. The method may further include storing the at least one survey query and the at least one real-time message in a database, whereby the database is adapted to be accessed for retrieval of the stored data. Still further, the method provides for rewarding a participant of the survey within the real-time paradigm.

Preferably, the step of collecting the at least one real-time message from the real-time discourse preferably includes connecting to a server where the real-time discourse is taking place, and collecting the at least one real-time message from such server where the real-time discourse is taking place. The at least one real-time message may be analyzed and indexed as it is collected by extracting at least one parameter from the at least one real-time message.

The step of matching the at least one real-time message to the at least one survey query to provide the dynamic, real-time survey result preferably includes inputting the at least one electronic form to a real-time survey matcher, inputting such collected real-time message to the real-time survey matcher, and matching the real-time message to the at least one survey query within the real-time survey matcher to provide the dynamic, real-time survey result. Preferably the at least one electronic form is input to the real-time matcher as a vector of binary data. More preferably, the binary data is a markup language including XML and HTML which may include content selected from the group consisting of text, graphics, static graphics, audio, and video. The step of matching within the real-time survey matcher may further include sorting at least one parameter of the at least one real-time message, associating a rating vector to the at least one parameter, and matching the sorted at least one parameter to the at least one survey query using the rating vector to form a list of ranked dynamic data. The list of ranked dynamic data may be continually updated in real-time using a plurality of continually incoming real-time messages from the server.

Still further, the step of outputting the dynamic, real-time survey result to the survey within the real-time paradigm preferably includes inputting the dynamic, real-time survey result into a real-time result presenter, and the real-time result presenter outputting the dynamic, real-time survey result to the survey within the real-time paradigm.

The present invention also provides a method for managing a plurality of surveys within a real-time paradigm based on real-time information including receiving a plurality of electronic forms having a plurality of differing survey queries. Such method includes inputting the plurality of differing survey queries into a real-time survey query processor, and providing a list of ranked dynamic data by filtering a plurality of differing parameters of the plurality of differing survey queries through a hierarchical tree diagram of a plurality of real-time discourse within the real-time survey query processor. The list of ranked dynamic data correlates the plurality of differing parameters to selected ones of the plurality of real-time discourse. The list of ranked dynamic data is input into a real-time survey matcher, parsed, and at least the plurality of differing parameters of the plurality of differing survey queries are posted within correlating ones of the plurality of real-time discourse based on the parsed list of ranked dynamic data. A plurality of real-time messages from the plurality of real-time discourse are collected whereby selected ones of the plurality of real-time messages are responsive to the posted plurality of differing parameters within the correlating selected ones of the plurality of real-time discourse. The collected plurality of real-time messages are matched to the plurality of differing survey queries within the real-time matcher to provide a plurality of dynamic, real-time survey results which are output to correlating ones of the plurality of surveys within the real-time paradigm.

In still further aspects, the present invention is also directed to articles of manufacture and computer program products which include a computer usable medium having computer readable program code means embodied therein for causing a computer to manage a survey within a real-time paradigm based on real-time information. The computer readable program code means in both the articles of manufacture and the computer program products comprise computer readable program code means for causing a computer to receive at least one electronic form having at least one survey query, to collect at least one real-time message from a real-time discourse, to match the at least one real-time message to the at least one survey query to provide a dynamic, real-time survey result, and to output the dynamic, real-time survey result to the survey within the real-time paradigm. The articles of manufacture and computer program products may further include computer readable code means for causing a computer to store the at least one survey query and the at least one real-time message in a database, the database adapted to be accessed for retrieval of the stored data.

The invention is also directed to articles of manufacture and computer program products including a computer usable medium having computer readable program code means embodied therein for causing a computer to causing a computer to manage a survey within a real-time paradigm based on real-time information. The articles of manufacture and computer program products both include a computer readable program code means for causing a computer to receive a plurality of electronic forms having a plurality of differing survey queries, to input the plurality of differing survey queries into a real-time survey query processor, and to provide a list of ranked dynamic data by filtering a plurality of differing parameters of the plurality of differing survey queries through a hierarchical tree diagram of a plurality of real-time discourse within the real-time survey query processor. The list of ranked dynamic data correlates the plurality of differing parameters to selected ones of the plurality of real-time discourse. The computer readable program code means also causes the computer to input the list of ranked dynamic data into a real-time survey matcher, to parse the list of ranked dynamic data within the real-time survey matcher, to post at least the plurality of differing parameters of the plurality of differing survey queries within correlating ones of the plurality of real-time discourse based on the parsed list of ranked dynamic data. A plurality of real-time messages are collected from the plurality of real-time discourse whereby selected ones of the plurality of real-time messages are responsive to the posted plurality of differing parameters within the correlating ones of the plurality of real-time discourse. The computer readable program code means of both the instant articles of manufacture and computer program products still further cause the computer to match the collected plurality of real-time messages to the plurality of differing survey queries within the real-time matcher to provide a plurality of dynamic, real-time survey results, and to output the plurality of dynamic, real-time survey results to correlating ones of the plurality of surveys within the real-time paradigm.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1–4 of the drawings in which like numerals refer to like features of the invention. Features of the invention are not necessarily shown to scale in the drawings.

The rapid increase in popularity of online chat indicates that chat is poised to become a mainstream form of communication amongst members of online communities. Despite the emerging popularity of real-time communication using the Internet, the implications of this paradigm for dynamic, real-time survey purposes have largely been overlooked. No general technique has been developed to deal with the opinions, concerns, and views of those being polled in a survey as their opinions, concerns, and views are constantly changing in real-time such as those initiated and conducted in real-time chat sessions.

As used herein, the term "real-time" refers to a level of computer responsiveness that a user senses as sufficiently immediate or that enables the computer to keep up with some external process such as "real-time" information which is updated at the same rate at which it is received guaranteeing a certain capability within a specified time constraint, for example, to present visualizations of the weather as it constantly changes. The term "dynamic" as used herein refers to that data which is capable of action or change.

The present invention provides dynamic, real-time surveys which guarantee a certain capability within a specified time constraint, whereby a user or a surveyor senses a response sufficiently immediate to provide the dynamic, real-time survey results of the invention to the surveyor. The invention overcomes the problems associated with conventional surveys by providing the unexpected advantage of initiating, conducting, and managing surveys easily and automatically in a real-time paradigm to provide quick, comprehensive, up-to-date, dynamic, real-time survey results; all at reduced costs, manual labor, and resources. The instant invention conveniently provides for initiating and conducting a survey, or a plurality of surveys, on the Internet, as the opinions of those being polled are continuously changing, while simultaneously making the real-time survey data accessible for immediate retrieval and analysis by the surveyors at a time when it is immediately needed. Preferably, the invention provides for real-time surveys in the context of an Internet chat session; however, as will be recognized, the present invention may be utilized with any other comparable form of real-time communication on the Internet.

The dynamic, real-time surveys of the present invention are provided by superimposing an additional layer of functionality upon an infrastructure provided by a Live Information Selection and Analysis "LISA" framework 40 for conducting the instant real-time, automatic surveys. In the preferred embodiment, the present invention utilizes a "LISA" framework as disclosed in U.S. patent application Ser. No. 09/511,846, herein incorporated by reference. However, as will be recognized, a variety of infrastructures provided by various different Live Information Selection and Analysis tools may be used in conjunction with the instant real-time surveys, whereby such systems are adapted to crawl, gather, summarize, and index real-time information making it immediately available for the real-time surveys of the invention.

In accordance with the present invention, multiple surveys may be initiated, conducted, and managed at the same time while simultaneously being formatted and summarized, and the results of such surveys being displayed to the surveyor as it arrives in the system, all within a real-time paradigm. Alternatively, the present invention allows for collection of survey data over a desired period of time which may be subsequently formatted and summarized, and the results displayed to the surveyor at a predetermined desired time. Still further, the invention provides for conducting and managing real-time surveys using real-time survey data in combination with any collected, archived survey data to produce real-time survey results and display the same to the surveyor as the real-time survey data is arriving in the system.

The present invention may be better understood in accordance with description below in reference to FIGS. 1–4. As shown, a surveyor at a client side computer may use a passive approach or an active approach of the present invention to simultaneously and automatically initiate, conduct, and manage real-time surveys using dynamic information. The passive approach is typically a one-way communication system wherein dynamic information is gathered from chat rooms, analyzed, and output to a surveyor component of the invention, all within a real-time paradigm. The active approach is typically a two-way communication system wherein dynamic information or survey queries are input into the chat rooms in real-time while simultaneously outputting dynamic, real-time information or messages in real-time from the chat rooms, whereby some messages are in response to the input dynamic survey queries.

Passive Approach

Figure 1:
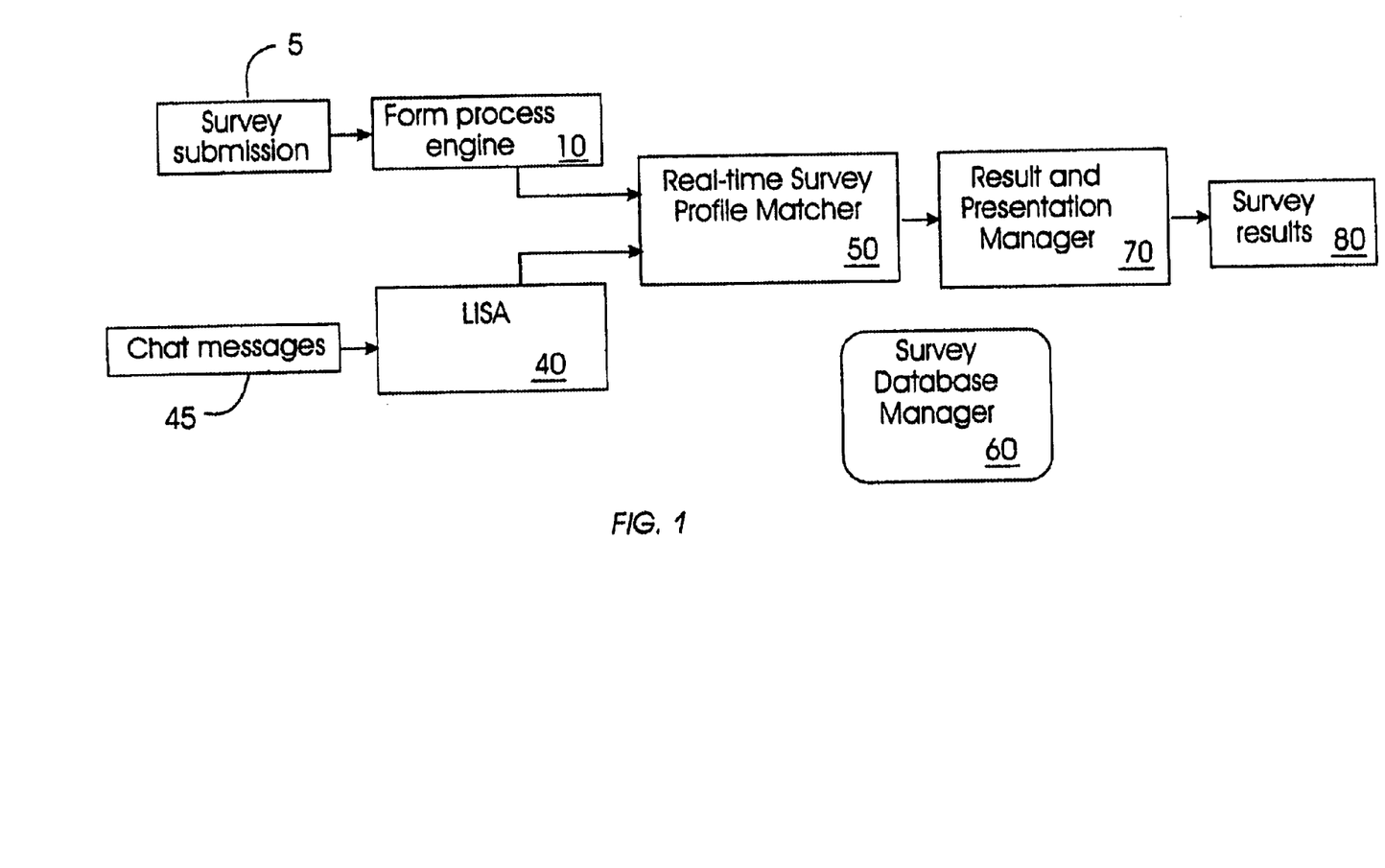
FIG. 1 is a block diagram of a typical architecture used to practice the passive approach of the present invention.
Figure 2:
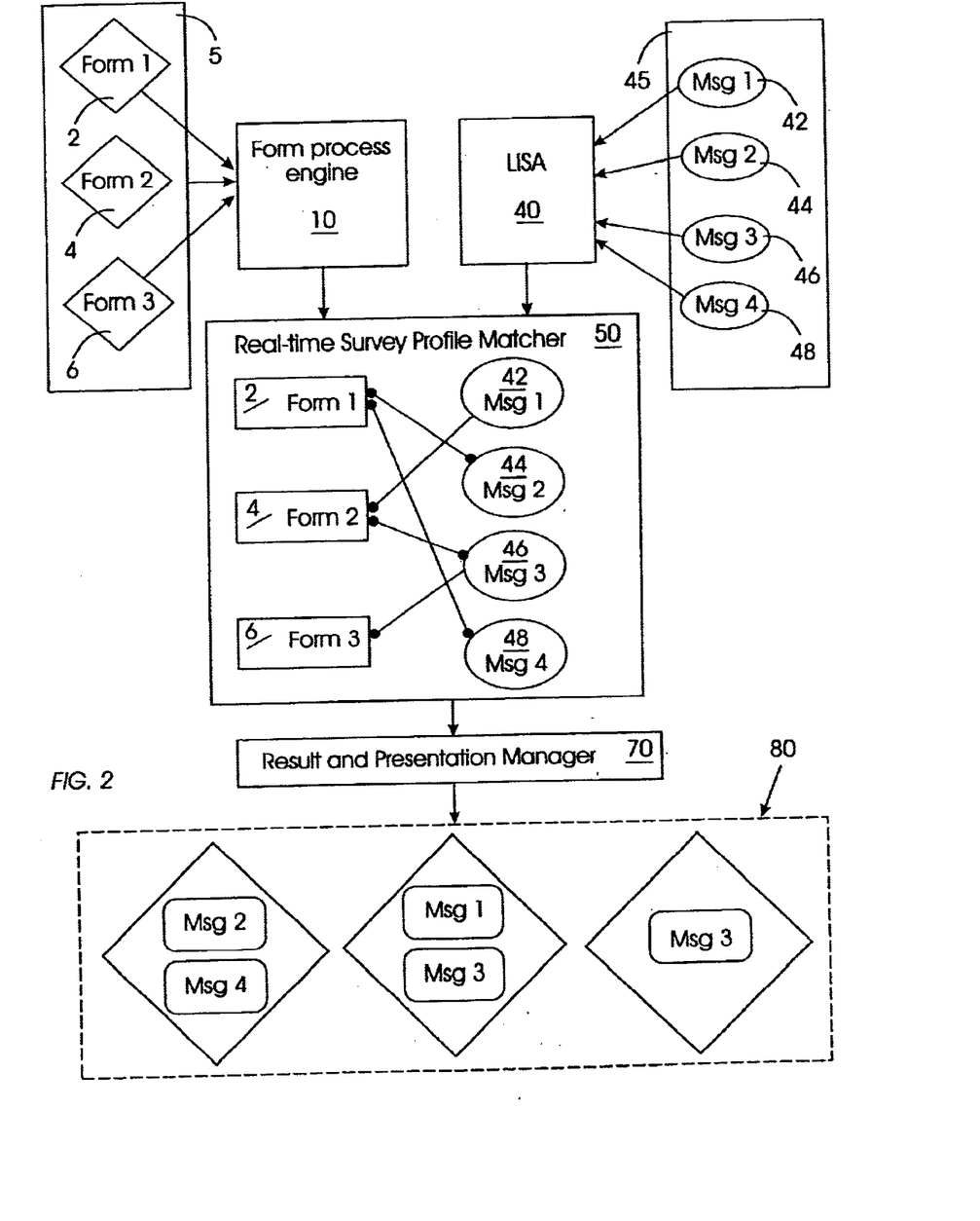
FIG. 2 is flow diagram of a typical process to practice the passive approach of FIG. 1 of the present invention.

FIGS. 1 and 2 illustrate the passive approach of the present invention. As shown, the system design of the passive approach comprises the following components:

1) Form Process Engine 10;
2) LISA Framework 40;
3) Real-time Survey Profile Matcher 50;
4) Survey Database Manager 60; and
5) Result and Presentation Manager 70.

Form Process Engine 10.

As shown in FIGS. 1 and 2, the Form Process Engine 10 represents the survey processing submission step 5 of the passive approach of the invention which receives and processes submitted survey forms 2, 4, and 6, for example, preferably through the Internet. As used herein, the term "user" or "surveyor" refers to the one submitting the real-time survey submission of the invention. A surveyor easily conducts a real-time survey on chat rooms by first filling out and submitting an electronic form. In accordance with the present invention, the electronic forms may include web-based forms including forms for a web browser, e-mail, cell phone, personal digital assistant, and the like, whereby each form contains a different survey query. Preferably, the electronic form is a web-based form or a plurality of differing web-based forms 2, 4, and 6 simultaneously filled-in or provided on a wide variety of topics. The surveyor may complete the web-based forms by including questions, keywords, phrases, and the like, which pertain to a particular survey topic to which the surveyor is interested in finding out the public's opinions, concerns, view points, and comments.

The form process engine 10 is capable of receiving and handling the multiple simultaneous survey submissions whereby the process engine is adapted to process such submitted survey forms 2, 4, and 6 through the web using, for example, CGI scripts, servlets, and the like. Furthermore, the submitted survey forms may follow a variety of predetermined guidelines as desired by the individual users or surveyors. The processed survey submissions are then output from the form process engine 10 to a real-time survey profile matcher 50 for further analysis. Preferably, the processed survey submissions are output from the process engine 10 as a vector of binary data of survey objects created using a markup language such as, for example, extensible markup language ("XML"), HTML, and the like, which may include text, graphics, audio, video, and the like, for example.

LISA Framework 40.

In the passive approach of the present invention, the LISA framework 40 is a software component that constantly monitors, or "listens to," current on-going chat conversations within a specific domain (e.g., Internet), or within a variety of domains of interest. The LISA framework 40 retrieves and collects the real-time data from within such domains, whereby the LISA framework automatically analyzes the "fresh" real-time data as it arrives, or alternatively analyzes the "fresh" real-time data in combination with any archived message data or information.

In the present invention, the LISA framework 40 provides the ability to conduct online surveys responsive to the content of chat sessions. In particular, it provides a step 45 of gathering the more "dynamic" data that is constantly changing in real-time, as is the case with Internet chat session messages from a real-time communication, such as the Internet, and analyzing such gathered information making it readily available for immediate analysis for the instant real-time surveys. The LISA framework 40 crawls through chat sessions, gathering a plurality of real-time chat session messages 42, 44, 46, and 48, for example, and summarizes and indexes such chat messages, whereby the plurality of real-time chat messages 42, 44, 46, and 48 may be from different chat sessions or the same chat session. In analyzing the real-time data, the LISA framework 40 extracts any useful information from the gathered, real-time data including, for example, the chat message date, a chatter's name or e-mail address, the chatter's comments, phrases, keywords, body text, titles, headers, and the like. The extracted information is then indexed or stored within the LISA framework for forwarding in real-time to the real-time survey profile matcher 50, along with the survey submissions of the form process engine 10, for the step of matching chat session messages to survey submissions.

Real-time Survey Profile Matcher 50.

The Real-time Survey Profile Matcher 50 is the component of the invention that automatically compares the input chat messages 42, 44, 46, and 48 from the LISA Framework 40 with the input surveys 2, 4, and 6 submitted from the form process engine 10. The real-time survey profile matcher 50 performs the extensive profile matching of the invention to form lists of ranked, or scored, high quality dynamic data including opinions, keywords, phrases, and the like which is output to the result and presentation manager 70. The ranked lists of matched dynamic data created in the real-time survey profile matcher 50 may be formed using known information retrieval technologies which create ranking or scoring algorithms.

The real-time survey profile matcher 50 of the invention performs the task of data-mining by sorting the extracted dynamic information or chat messages 42, 44, 46, and 48 from the LISA Framework 40, associating a rating vector to each sorted extracted dynamic data, and matching the rated data with appropriate ones of the submitted surveys 2, 4, and 6 from the form process engine 10, all within a real-time paradigm. Preferably, the extracted dynamic information is sorted by sorting parameters of the extracted dynamic information including chat message date, chatter name, e-mail address, chat message, phrase, keyword, body text, title, and header, for example. The rating vector of the survey profile matcher 50 indicates whether or not a given parameter of the extracted dynamic data is relevant to a particular survey, or a variety of surveys, to compile a list of raw data which is output to the result and presentation manager 70 for conversion.

For example, as illustrated in FIG. 2, the plurality of submitted survey forms 2, 4, and 6, may be matched to the plurality of forwarded chat messages 42, 44, 46, and 48, whereby the chat messages may correlate with more than one survey, such as a first chat message 42 and a third chat message 46 correlating with a second survey submission 4. Likewise, survey submissions may correlate with more than one chat messages, such as a first survey submission 2 correlating with a second chat message 44 and a forth chat message 48.

Preferably, the matching within the real-time survey profile matcher 50 is done by comparing keywords in a particular survey to keywords from chat messages and ranking such information in real-time from the most to the least relevant for a particular submitted survey to build the lists of high quality opinions or keyword lists within the real-time survey profile matcher 50. More preferably, the keyword list is compiled as raw data, such as markup language including an XML format, to provide the result and presentation manager 70 with increased flexibility for conversion of the raw data into a presentable, viewable format for the surveyors. Alternatively, sophisticated linguistic analysis including, for example, matching sentence subject, may be used to enhance the quality of the result list.

Survey Database Manager 60.

The Survey Database Manager 60 of the present invention manages the plurality of survey submissions 2, 4, and 6 of step 5 submitted by the surveyors and any corresponding responding chat messages 42, 44, 46, and 48 of step 45 from the chatters. In particular, the survey database manager 60 is the database storage component of the invention for storing the data, including the survey query and the collected data from the LISA component, for retrieval for further analysis by the other components of the invention.

Result and Presentation Manager 70.

The Result and Presentation Manager 70, or real-time result presenter, is the component of the invention which receives the raw input data from the Real-time Survey Profile Manager 50 and outputs the survey results 80 to a particular survey or a number of surveys to which the results pertain. The result and presentation manager 70 may present, deliver, or output the survey results to the surveyor either in an electronic form including web pages, e-mails, databases, spreadsheets, and the like, in a format which is the most appropriate for the particular output device. For example, if the output device is a computer browser, then the "raw" XML results input from the real-time survey profile matcher 50 are converted to HTML format via extensible style-sheet language transformations ("XSLT") for viewing. XSLT is designed for use as a part of XSL which is a style-sheet language for XML. In addition to XSLT, XSL includes an XML vocabulary for specifying formatting. XSL specifies the styling of an XML document by using XSLT to describing how the document is transformed into another XML document that uses the formatting vocabulary. Alternatively, if the presentation device is a hand-held device with limited memory size and color depth, such as a palm pilot, a different presentation as known and used in the art may be applied to convert the "raw" XML results input from the real-time survey profile matcher to a viewable format.

The result and presentation manager 70 may receive a number of raw input data matches from the real-time survey profile matcher. For example, result and presentation manager 70 may receive 2000 raw input data matches or results which must then be converted to a viewable format. The surveyor(s) may receive such converted, viewable survey matches from the result and presentation manager 70 by electronic delivery such as web pages, e-mails, databases, spreadsheets, and the like. The surveyor(s) may then filter through the real-time survey results which are continually being dynamically updated and refreshed in real-time to provide accurate, up-to-date, real-time survey results.

As an example of the passive approach of the present invention, a user who works for a computer company may be interested in finding out what the public thinks about a recently launched product. The user initiates the survey by entering the desired data in the web-based form which is processed in the form process engine 10 and then output to the real-time survey profile matcher 50. The invention simultaneously uses a LISA framework 40 which monitors current on-going chat conversations within a specific domain, such as the Internet, gathering "fresh" chat message data. The "fresh" real-time chat messages, as well as possibly any archived chat messages, are output to the real-time survey profile matcher whereby such data is automatically analyzed as it arrives. The real-time survey profile matcher 50 associates a rating vector to each comment phrase, or keyword made by a user which indicates whether or not the comment is relevant to a particular survey, or a variety of surveys, to compile the list of raw data. The real-time survey profile matcher continuously updates the matching process of the incoming chat messages with any relevant processed incoming survey submissions whereby a particular chat message may have associated therewith a number of different rating vectors, each corresponding to a differing survey, which may be updated in real-time. The lists of raw data from the real-time survey profile matcher 50 are output to the result and presentation manager 70 for conversion into a viewable format by the surveyor to provide the real-time survey results 80 of the invention.

The passive approach of the present invention provides the ability for a number of users to initiate surveys simultaneously, whereby an incoming message has an associated data structure, or array of rating vectors, which will be updated from the survey matching process in real-time. In accordance with the present invention, the instant real-time survey may be an on-going real-time survey lasting for a predetermined length of time, for example, one minute, or alternatively persisting for an infinite amount of time while continuously running within a real-time paradigm.

Active Approach:

Alternatively, a user may implement the present invention using an active approach. Unlike the passive approach, the active approach comprises a two-way communication giving a surveyor the ability to dynamically monitor the conversation being held in any given chat room and be able to display survey questions, within such chat rooms, that match the theme of the conversation to elicit comments, concerns, and opinions of users within the particular chat rooms.

Figure 3:
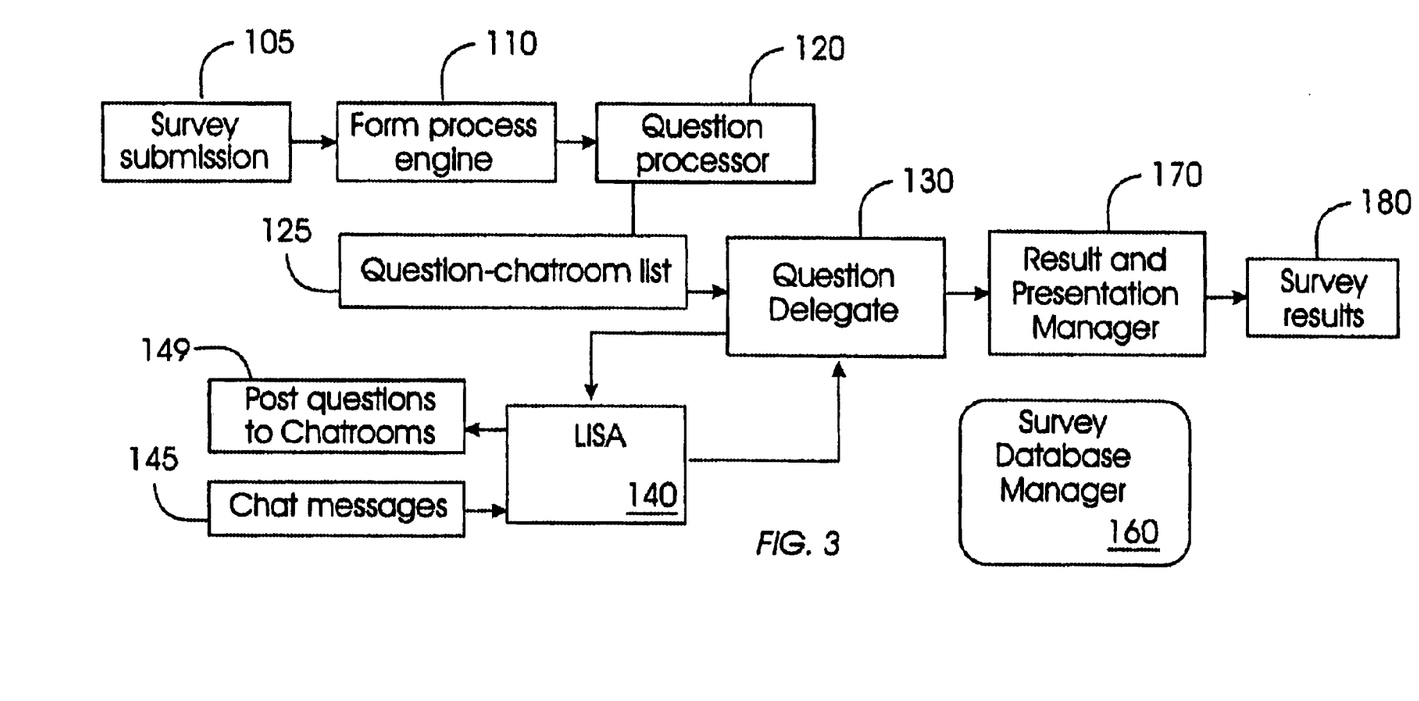
FIG. 3 is a block diagram of a typical architecture used to practice the active approach of the present invention.
Figure 4A:
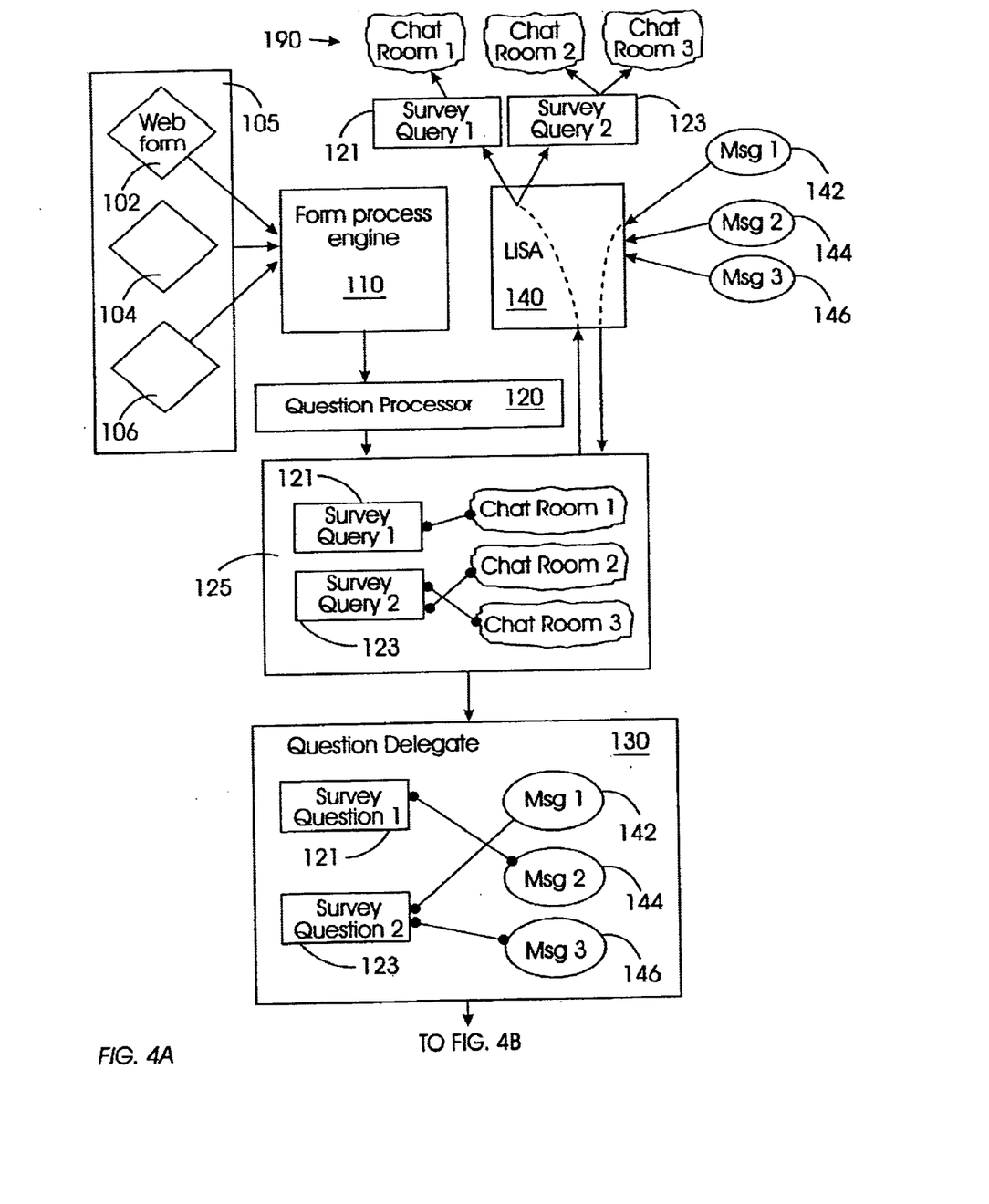
FIG. 4 is flow diagram of a typical process to practice the active approach of FIG. 3 of the present invention.
Figure 4B:
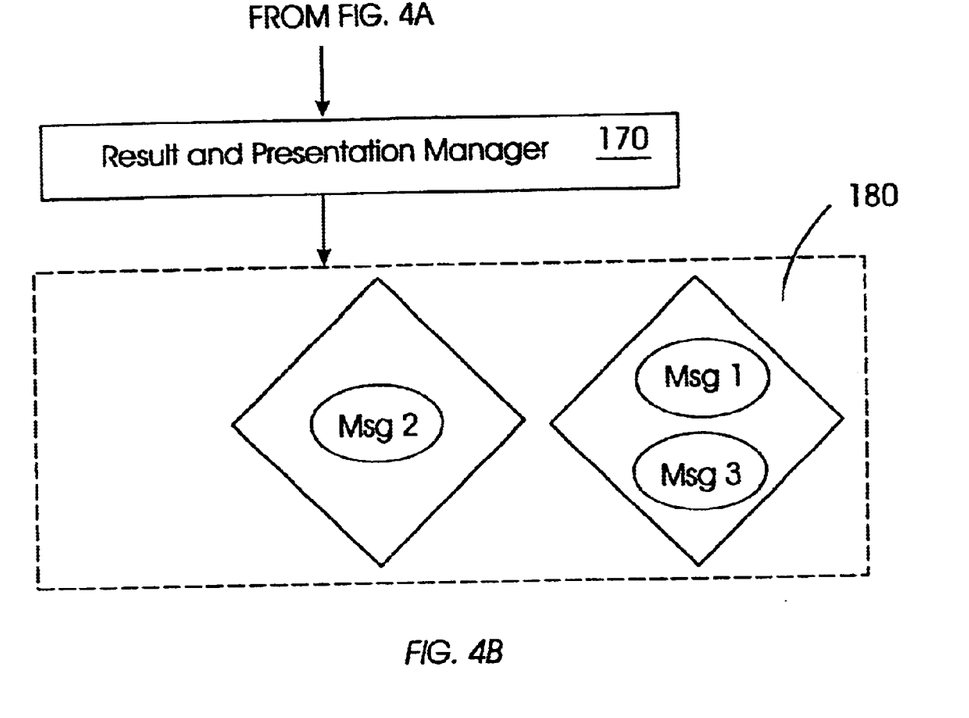

FIGS. 3 and 4 illustrate the active approach of the present invention for automatically initiating, conducting and managing surveys based on real-time information. As shown the system design of the active approach comprises the following components:
1) Form Process Engine 110;
2) Question Processor 120;
3) Question Delegate 130;
4) LISA Framework 140;
5) Survey Database Manager 160; and
6) Result/Presentation Manager 170.

Form Process Engine 110.

As in the passive approach, the Form Process Engine 110 of the active approach also represents the component of the invention which receives and processes survey forms submitted through the Internet, functioning substantially similar as in the passive approach. In the active approach, a surveyor initiates a real-time survey or surveys on chat rooms in step 105 by filling out and submitting an electronic form including web-based forms, such as forms for a web browser, e-mail, cell phone, personal digital assistant, and the like, whereby each form contains a different survey query. Preferably, the electronic form is a web-based form or a plurality of differing web-based forms 102, 104, and 106 simultaneously filled-in or provided on a wide variety of topics of interest for surveying. The form process engine 110 of the active approach is adapted to receive and handle multiple survey submissions simultaneously processing the submitted survey forms through the web using, for example, CGI scripts, servlets, and the like. However, rather than outputting the processed survey submissions to a real-time survey profile matcher 50 for further analysis as in the passive approach, the active approach outputs the processed survey submissions to a question processor 120 for further analysis.

Preferably, in the active approach the processed survey submissions are output from the form process engine 110 to the question processor 120 as a vector of binary data of survey objects created using a markup language such as, for example, extensible markup language ("XML"), HTML, and the like, which include text, graphics, audio, video, and the like, for example.

Question Processor 120.

The Question Processor 120 of the active approach is the component that processes each submitted survey form, i.e. survey forms 102, 104, and 106, input from the form process engine 110 and classifies such submitted surveys into the appropriate, or type of chat room(s), to which each submitted survey correlates. Preferably, the classification is done based on particular questions, keywords, phrases, and the like, extracted from the submitted surveys. For example, the question processor may use keywords including nouns, phrases, parts of speech in the questions, and the like, to classify each submitted survey. Furthermore, the question processor 120 may also make use of sophisticated linguistic analysis including, for example, matching sentence subject to enhance the result of correlation to the appropriate chat room.

In the present invention, the chat rooms may be grouped into categories according to topic, type, nature, class, and the like. For example, chat rooms may be grouped according to their nature such as politics, entertainment, and regional, whereby each category may further have subgroups, such as the regional category having subgroups North America, Europe, Asia, and Africa.

Thus, in accordance with the active approach of the present invention, the categories of chat rooms are preferably structured into a hierarchical tree diagram for filtering questions, keywords, phrases, and the like, of the submitted surveys from the form process engine 110. In such hierarchical tree diagrams, surveys that correlate with chat rooms higher on the hierarchical tree of categories are more general or broad, whereas surveys which correlate with chat rooms lower on the hierarchical tree of categories are more specific or narrow. As the particular survey questions, keywords, and phrases are filtered down the hierarchical tree of categories, they are provided in a number of lists of questions or under a number of different subgroups, whereby each list correlates to a particular chat room or category of chat rooms. Hence, as illustrated in FIG. 4, with the implementation of the LISA framework 140, a single survey query 121 from a submitted survey form may be posted in a variety of chat rooms 190, and still further under a variety of subgroups of such varying chat rooms.

In the active approach, the particular questions, keywords, phrases, and the like, of the submitted survey queries from the question processor 120 are filtered through the hierarchical tree diagram of the question processor 120 during classification of such surveys to build a list of "survey questions-to-chat rooms" 125 which correlates particular survey queries 121 and 123 of the submitted survey forms with particular ones of the plurality of chat rooms. The "survey questions-to-chat rooms" 125 is then input into the question delegate 130 for further analysis, preferably as raw data, including any markup language as known and used in the art, such as, for example, XML and HTML.

Question Delegate 130.

The Question Delegate 130, or question router of the active approach is the real-time survey matcher component that directly interfaces with the question processor 120 to obtain the list of "survey questions-to-chat rooms" as input, while simultaneously parsing such lists, i.e. analyzing or separating the input data into more easily processed components, for submission to the LISA framework 140, while also receiving incoming chat messages from the LISA component for the matching analysis of the active approach. The LISA framework 140 injects the plurality of parsed survey queries 121 and 123 into specified chat rooms based on the list of "survey questions-to-chat rooms" 125 from the question processor 120. The LISA framework 140 "listens" to a predetermined number of chat messages or responses to the submitted survey queries as determined by the surveyor, and gathers, summarizes, and indexes the responding chat messages 142, 144, and 146.

The question delegate 130 automatically sorts the extracted dynamic chat messages 142, 144, and 146 from the LISA Framework 140 and matches such data with appropriate ones of the multiple simultaneously survey queries or questions 121 and 123 parsed from the list of "survey questions-to-chat rooms" 125 using known information retrieval technologies matching techniques.

Thus, the question delegate 130 is the component of the active approach that performs the extensive profile matching of the invention to output the list of high quality opinions or keyword lists. The question processor 120 ranks the analyzed information from the most to the least relevant, or vice versa, in real-time for a particular submitted survey to build lists of ranked, or scored, high quality dynamic data including opinions, keywords, phrases, and the like, as discussed further above, which are output to the result and presentation manager 170 for conversion into a viewable format. As in the passive approach, the keyword list in the active approach is preferably compiled or written in an XML format to provide the result and presentation manager 170 with increased flexibility for presenting the survey results.

LISA Framework 140.

As discussed above in relation to the passive approach, the LISA Framework 140 of the active approach functions substantially similar as in the passive approach as a gathering and analyzing tool for the "dynamic" Internet chat session data which is constantly changing in real-time. As in the passive approach, the LISA framework 140 in the active approach constantly monitors, or "listens to," current on-going chat conversations within a specific domain (e.g., Internet), or within a variety of domains of interest, therein retrieving and collecting the real-time data. The LISA framework 140 automatically analyzes the "fresh" real-time data as it arrives, or alternatively analyzes the "fresh" real-time data in combination with any archived message data or information. As in the passive approach, the LISA framework 140 of the active approach extracts any useful information from the gathered, real-time data including, for example, the chat message date, a chatter's name or e-mail address, the chatter's comments, phrases, keywords, and the like. The extracted information is then indexed or stored within the LISA framework 140 for uploading or outputting to the question delegate 130 for further analysis along with the list of "survey questions-to-chat rooms" from the question processor 120.

However, in the active approach, the LISA framework 140 includes an additional layer of functionality comprising a "message injection" tool. In the active approach, a two-way communication LISA framework 140 is used which is adapted to both "inject" particular parsed survey queries 121 and 123 into specified chat rooms based on the list of "survey questions-to-chat rooms" 125 from the question processor 120, while simultaneously outputting the gathered real-time survey data into the question delegate 130 for continuous, real-time survey data result analysis. The two-way communication of the active approach gives the surveyor the ability to dynamically monitor the conversation being held in any given chat room while being able to display survey questions, within such chat rooms, that match the theme of the conversation to elicit comments, concerns, and opinions of users within the particular chat room.

Thus, in accordance with the active approach, the question delegate 130 sends the survey questions 121 and 123 to the LISA framework 140 which in turn interjects, or posts, such survey questions within appropriate ones of a number of chat rooms 190 as corresponding to the list of "survey questions-to-chat rooms" 125. The LISA framework "listens" to the chat rooms having the submitted survey questions, and may gather a predetermined number of chat message responses to such survey questions, or alternatively may sit in each chat room for a predetermined period of time collecting the chat message responses to the survey questions. For example, the LISA framework may sit in a particular chat room for 30 minutes collecting chat message responses, or alternatively may collect the first 100 (one hundred) chat message responses to the submitted survey questions within such chat rooms. The gathered chat message responses 142, 144, and 146 from the LISA system are output to the question delegate 130 for further analysis, all within the real-time paradigm of the invention.

Survey Database Manager 160.

In the active approach, the survey database manager 160 is the same component as in the passive approach, as described in detail above, which manages the questions submitted by the surveyor and any corresponding responses from the chatters. The survey database manager 160 of the active approach provides the data store and retrieval for the other components of the present embodiment of the invention.

Result and Presentation Manager 170.

As in the passive approach described in detail above, the result and presentation manager 170 of the active approach functions substantially similar receiving the raw survey input data, and converting such raw data to a viewable form for outputting the real-time survey results 180 to a particular survey or a number of surveys to which the results pertain. The result and presentation manager 170 delivers, or outputs, the survey results to the surveyor either in web pages or e-mails in a format which is the most appropriate for the particular output device. However, rather than receiving the raw survey data from a real-time survey profile matcher as in the active approach, the result and presentation manager 170 of the active approach receives the raw survey input data from the question delegate 130.

As an example of the active approach of the present invention, a survey may be automatically initiated, conducted and managed based on real-time information by a surveyor providing a list of survey questions. The active approach sorts the questions of the survey and assigns the questions to different correlating chat rooms based on the category of the chat room. For example, a question such as "Would you take a vacation to Alaska?" may be input into certain chat rooms having topics or themes including geographical and travel whereby each chat room may further have subgroups such as travel having subgroups cruises and Alaska, for example. The present invention utilizes the "LISA" framework 140 to "inject" the questions into the relevant chat rooms and a vector of responding messages for a predetermined period of time, such as 10–20 seconds for example, are collected after the questions have been posted within the chat rooms and a rating vector is assigned to each comment made by the chatters. In collecting the real-time chat messages, the chat participant is not required to complete a survey submission form. The chatter simply responds to survey queries submitted into a chat room by providing or posting chat messages in a conventional manner in the chat rooms whereby the present invention collects such posted chat messages for a predetermined period, thereby eliminating the need for the chatter to perform the additional task of completing a survey submission. The surveyor then receives a dynamic survey result set which presents new information for the duration of the survey. The survey results are then formatted and delivered to the survey initiator for viewing.

As in the passive approach, the surveys conducted in accordance with the active approach may be conducted for a predetermined period of time whereby the real-time surveys are dynamically updated in real-time to provide current, up-to-date survey results.

In accordance with both approaches of the present invention, a comment made by a chatter could be of interest to a plurality of surveys. For example, a chat message stating that "I like IBM's new jCentral search engine . . . ", may be of interest to a survey researching the popularity of IBM, a survey researching the popularity of jCentral, as well as a general survey researching popular companies. The instant invention has many advantages and utilities as the amount of data exchanged during real-time communication, such as instant messaging, for example, continually increases at a fast pace. The invention provides the advantage of having immediate survey results at an immediate time when it is needed for the continually increasing real-time communication technologies, as well as marketing companies. It provides the advantage to the survey participant of not having to participate in the additional task of fill-in a survey query. Rather, the survey participants may voluntarily sign-up or register with a provider of the instant invention whereby the survey participants' answers, comments, phrases, or opinions are directly taken in real-time from the chat messages provided by the survey participants within the each chat room. The provider of the instant invention may protect the privacy of the survey participants, as well as reward the survey participants by known techniques such as, for example, monetary rewards, prize awards, recognition, and the like.

The present invention overcomes the problems associated with the prior art of conducting surveys, in particular, the problems associated with outdated or archaic survey results. For instance, the prior art includes web based systems for conducting surveys which typically entail selecting a survey answer box or submitting a survey answer to a server processing system at a time later than the survey submission and for still a later time for analysis to provide the survey results. The present invention overcomes such problems by providing survey initiation and analysis in a real-time discourse to provide up-to-date, real-time survey results which are continually and dynamically being updated. The instant invention also overcomes the prior art by eliminating the need for chatters to answer a survey form. The present invention utilizes a LISA framework to "listen" to on-going chat sessions for gathering, analyzing, summarizing, and index chat messages from such chat sessions. The invention uses the indexed chat messages if it contains data which pertains to a particular survey topic. The invention also overcomes the prior art by allowing for a plurality of surveys to be conducted simultaneously within a real-time discourse, whereas prior art surveys typically comprise a single survey. Still further, conventional surveys are typically limited to the number, content, and scope of the survey answers. The present invention gathers, summarizes, and indexes all comments from the chatter in relation to particular survey topics and utilizes such comments in the analysis of a plurality of real-time surveys.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method for managing a survey within a real-time paradigm based on real-time information comprising:

receiving at least one electronic form having at least one survey query;

collecting at least one real-time message from a real-time discourse;

matching said at least one real-time message to said at least one survey query to provide a dynamic, real-time survey result;

outputting said dynamic, real-time survey result to said survey within said real-time paradigm; and rewarding a participant of said survey within said real-time paradigm.

2. The method of claim 1 wherein said at least one electronic form comprises a web-based form selected from the group consisting a web browser form, an e-mail form, cell phone form, and personal digital assistant form.

3. The method according to claim 1 wherein said at least one survey query of said at least one electronic form includes content selected from the group consisting of questions, keywords, and phrases.

4. The method of claim 1 wherein said at least one real-time message comprises an Internet chat message.

5. The method of claim 1 wherein said real-time discourse comprises an Internet chat room.

6. The method of claim 1 further comprising:
receiving a plurality of electronic forms having a plurality of differing survey queries;
collecting a plurality of real-time messages from said real-time discourse;
matching said plurality of real-time messages to correlating ones of said plurality of differing survey queries of said plurality of electronic forms to provide a plurality of dynamic, real-time survey results;
outputting said plurality of dynamic, real-time survey results to correlating ones of a plurality of said survey within said real-time paradigm; and
outputting said dynamic, real-time survey result to said survey within said real-time paradigm.

7. The method of claim 1 further including storing said at least one survey query and said at least one real-time message in a database, said database adapted to be accessed for retrieval of the stored at least one survey query and said at least one real-time message.

8. The method of claim 1 further including managing said real-time surveys continuously within said real-time paradigm for a predetermined length of time.

9. The method of claim 1 wherein the step of collecting said at least one real-time message from said real-time discourse comprises:
connecting to a server where said real-time discourse is taking place; and
collecting said at least one real-time message from said server where said real-time discourse is taking place.

10. The method of claim 9 wherein the step of collecting said at least one real-time message from said server further comprises analyzing and indexing said at least one real-time message as it is collected by extracting at least one parameter from said at least one real-time message.

11. The method of claim 10 wherein said at least one parameter is selected from the group consisting of chat message date, chatter name, e-mail address, chat message, phrase, keyword, body text, title, and header.

12. The method of claim 9 wherein the step of matching said at least one real-time message to said at least one survey query to provide said dynamic, real-time survey result comprises:
inputting said at least one electronic form to a real-time survey matcher;
inputting said collected at least one real-time message to said real-time survey matcher; and
matching said at least one real-time message to said at least one survey query within said real-time survey matcher to provide said dynamic, real-time survey result.

13. The method of claim 12 wherein said at least one electronic form is input to said real-time matcher as a vector of binary data.

14. The method of claim 13 wherein said binary data comprises a markup language selected from the group consisting of XML and HTML.

15. The method of claim 14 wherein said markup language includes content selected from the group consisting of text, graphics, static graphics, audio, and video.

16. The method of claim 12 wherein the step of matching within said real-time survey matcher comprises:

sorting at least one parameter of said at least one real-time message;
associating a rating vector to said at least one parameter; and
matching said sorted at least one parameter to said at least one survey query using said rating vector to form a list of ranked dynamic data.

17. The method of claim 16 wherein said at least one parameter is selected from the group consisting of chat message date, chatter name, e-mail address, chat message, phrase, keyword, body text, title, and header.

18. The method of claim 16 further including continually updating said list of ranked dynamic data in real-time using a plurality of continually incoming real-time messages from said server.

19. The method of claim 12 wherein the step of outputting said dynamic, real-time survey result to said survey within said real-time paradigm comprises:
inputting said dynamic, real-time survey result into a real-time result presenter; and
said real-time result presenter outputting said dynamic, real-time survey result to said survey within said real-time paradigm.

20. The method of claim 19 further including converting said dynamic, real-time survey result to a format viewable by a surveyor within said real-time result presenter.

21. A method for managing a plurality of surveys within a real-time paradigm based on real-time information comprising:
receiving a plurality of electronic forms having a plurality of differing survey queries;
inputting said plurality of differing survey queries into a real-time survey query processor;
providing a list of ranked dynamic data by filtering a plurality of differing parameters of said plurality of differing survey queries through a hierarchical tree diagram of a plurality of real-time discourse within said real-time survey query processor, said list of ranked dynamic data correlating said plurality of differing parameters to selected ones of said plurality of real-time discourse;
inputting said list of ranked dynamic data into a real-time survey matcher;
parsing said list of ranked dynamic data within said real-time survey matcher;
posting at least said plurality of differing parameters of said plurality of differing survey queries within correlating selected ones of said plurality of real-time discourse based on said parsed list of ranked dynamic data;
collecting a plurality of real-time messages from said plurality of real-time discourse whereby selected ones of said plurality of real-time messages being responsive to said posted plurality of differing parameters within said correlating selected ones of said plurality of real-time discourse;
matching said collected plurality of real-time messages to said plurality of differing survey queries within said real-time matcher to provide a plurality of dynamic, real-time survey results;
outputting said plurality of dynamic, real-time survey results to correlating ones of said plurality of surveys within said real-time paradigm; and
rewarding a participant of said survey within said real-time paradigm.

22. An article of manufacture comprising:
a computer usable medium having computer readable program code means embodied therein for causing a computer to manage a survey within a real-time paradigm based on real-time information, the computer readable program code means in said article of manufacture comprising:
- computer readable program code means for causing a computer to receive at least one electronic form having at least one survey query;
- computer readable program code means for causing a computer to collect at least one real-time message from a real-time discourse;
- computer readable program code means for causing a computer to match said at least one real-time message to said at least one survey query to provide a dynamic, real-time survey result;
- computer readable program code means for causing a computer to output said dynamic, real-time survey result to said survey within said real-time paradigm; and
- computer readable program code means for causing a computer to reward a participant of said survey within said real-time paradigm.

23. The article of claim 22 further including computer readable code means for causing a computer to store said at least one survey query and said at least one real-time message in a database, said database adapted to be accessed for retrieval of the stored at least one survey query and said at least one real-time message.

24. The article of claim 22 wherein said computer readable code means for causing a computer to collect said at least one real-time message from said real-time discourse comprises:
- computer readable program code means for causing a computer to connect to a server where said real-time discourse is taking place; and
- computer readable program code means for causing a computer to collect said at least one real-time message from said server where said real-time discourse is taking place.

25. The article of claim 22 wherein said computer readable code means for causing a computer to match said at least one real-time message to said at least one survey query to provide said dynamic, real-time survey result comprises:
- computer readable program code means for causing a computer to input said at least one electronic form to a real-time survey matcher;
- computer readable program code means for causing a computer to input said collected at least one real-time message to said real-time survey matcher; and
- computer readable program code means for causing a computer to match said at least one real-time message to said at least one survey query within said real-time survey matcher to provide said dynamic, real-time survey result.

26. The article of claim 22 wherein said computer readable code means for causing a computer to match within said real-time survey matcher comprises:
- computer readable program code means for causing a computer to sort at least one parameter of said at least one real-time message;
- computer readable program code means for causing a computer to associate a rating vector to said at least one parameter; and
- computer readable program code means for causing a computer to match said sorted at least one parameter to said at least one survey query using said rating vector to form a list of ranked dynamic data.

27. The article of claim 22 wherein the step of outputting said dynamic, real-time survey result to said survey within said real-time paradigm comprises:
- computer readable program code means for causing a computer to input said dynamic, real-time survey result into a real-time result presenter; and
- computer readable program code means for causing a computer to output said dynamic, real-time survey result from said real-time result presenter to said survey within said real-time paradigm.

28. An article of manufacture comprising:
a computer usable medium having computer readable program code means embodied therein for causing a computer to manage a survey within a real-time paradigm based on real-time information, the computer readable program code means in said article of manufacture comprising:
- computer readable program code means for causing a computer to receive a plurality of electronic forms having a plurality of differing survey queries;
- computer readable program code means for causing a computer to input said plurality of differing survey queries into a real-time survey query processor;
- computer readable program code means for causing a computer to provide a list of ranked dynamic data by filtering a plurality of differing parameters of said plurality of differing survey queries through a hierarchical tree diagram of a plurality of real-time discourse within said real-time survey query processor, said list of ranked dynamic data correlating said plurality of differing parameters to selected ones of said plurality of real-time discourse;
- computer readable program code means for causing a computer to input said list of ranked dynamic data into a real-time survey matcher;
- computer readable program code means for causing a computer to parse said list of ranked dynamic data within said real-time survey matcher;
- computer readable program code means for causing a computer to post at least said plurality of differing parameters of said plurality of differing survey queries within correlating selected ones of said plurality of real-time discourse based on said parsed list of ranked dynamic data;
- computer readable program code means for causing a computer to collect a plurality of real-time messages from said plurality of real-time discourse whereby selected ones of said plurality of real-time messages being responsive to said posted plurality of differing parameters within said correlating selected ones of said plurality of real-time discourse;
- computer readable program code means for causing a computer to match said collected plurality of real-time messages to said plurality of differing survey queries within said real-time matcher to provide a plurality of dynamic, real-time survey results;
- computer readable program code means for causing a computer to output said plurality of dynamic, real-time survey results to correlating ones of said plurality of surveys within said real-time paradigm; and
- computer readable program code means for causing a computer to reward a participant of said survey within said real-time paradigm.

29. A computer program product comprising:
a computer usable medium having computer readable program code means embodied therein for causing a computer to manage a survey within a real-time paradigm based on real-time information, the computer readable program code means in said article of manufacture comprising:
  computer readable program code means for causing a computer to receive at least one electronic form having at least one survey query;
  computer readable program code means for causing a computer to collect at least one real-time message from a real-time discourse;
  computer readable program code means for causing a computer to match said at least one real-time message to said at least one survey query to provide a dynamic, real-time survey result;
  computer readable program code means for causing a computer to output said dynamic, real-time survey result to said survey within said real-time paradigm; and
  computer readable program code means for causing a computer to reward a participant of said survey within said real-time paradigm.

30. The computer program of claim 29 further including computer readable code means for causing a computer to store said at least one survey query and said at least one real-time message in a database, said database adapted to be accessed for retrieval of the stored at least one survey query and said at least one real-time message.

31. The computer program of claim 29 wherein said computer readable code means for causing a computer to collect said at least one real-time message from said real-time discourse comprises:
  computer readable program code means for causing a computer to connect to a server where said real-time discourse is taking place; and
  computer readable program code means for causing a computer to collect said at least one real-time message from said server where said real-time discourse is taking place.

32. The computer program of claim 29 wherein said computer readable code means for causing a computer to match said at least one real-time message to said at least one survey query to provide said dynamic, real-time survey result comprises:
  computer readable program code means for causing a computer to input said at least one electronic form to a real-time survey matcher;
  computer readable program code means for causing a computer to input said collected at least one real-time message to said real-time survey matcher; and
  computer readable program code means for causing a computer to match said at least one real-time message to said at least one survey query within said real-time survey matcher to provide said dynamic, real-time survey result.

33. The computer program of claim 29 wherein said computer readable code means for causing a computer to match within said real-time survey matcher comprises:
  computer readable program code means for causing a computer to sort at least one parameter of said at least one real-time message;
  computer readable program code means for causing a computer to associate a rating vector to said at least one parameter; and
  computer readable program code means for causing a computer to match said sorted at least one parameter to said at least one survey query using said rating vector to form a list of ranked dynamic data.

34. The computer program of claim 29 wherein the step of outputting said dynamic, real-time survey result to said survey within said real-time paradigm comprises:
  computer readable program code means for causing a computer to input said dynamic, real-time survey result into a real-time result presenter; and
  computer readable program code means for causing a computer to output said dynamic, real-time survey result from said real-time result presenter to said survey within said real-time paradigm.

35. A computer program product comprising:
  a computer usable medium having computer readable program code means embodied therein for causing a computer to manage a survey within a real-time paradigm based on real-time information, the computer readable program code means in said article of manufacture comprising:
  computer readable program code means for causing a computer to receive at least one electronic form having at least one survey query;
  computer readable program code means for causing a computer to input said plurality of differing survey queries into a real-time survey query processor;
  computer readable program code means for causing a computer to provide a list of ranked dynamic data by filtering a plurality of differing parameters of said plurality of differing survey queries through a hierarchical tree diagram of a plurality of real-time discourse within said real-time survey query processor, said list of ranked dynamic data correlating said plurality of differing parameters to selected ones of said plurality of real-time discourse;
  computer readable program code means for causing a computer to input said list of ranked dynamic data into a real-time survey matcher;
  computer readable program code means for causing a computer to parse said list of ranked dynamic data within said real-time survey matcher;
  computer readable program code means for causing a computer to post at least said plurality of differing parameters of said plurality of differing survey queries within correlating selected ones of said plurality of real-time discourse based on said parsed list of ranked dynamic data;
  computer readable program code means for causing a computer to collect a plurality of real-time messages from said plurality of real-time discourse whereby selected ones of said plurality of real-time messages being responsive to said posted plurality of differing parameters within said correlating selected ones of said plurality of real-time discourse;
  computer readable program code means for causing a computer to match said collected plurality of real-time messages to said plurality of differing survey queries within said real-time matcher to provide a plurality of dynamic, real-time survey results;
  computer readable program code means for causing a computer to output said plurality of dynamic, real-time survey results to correlating ones of said plurality of surveys within said real-time paradigm; and
  computer readable program code means for causing a computer to reward a participant of said survey within said real-time paradigm.

* * * * *